United States Patent [19]

Vida et al.

[11] 3,919,427

[45] Nov. 11, 1975

[54] THERAPEUTIC COMPOSITIONS CONTAINING 1-METHYL-3-ALKOXYMETHYL-5,5-DISUBSTITUTED BARBITURIC ACID COMPOUNDS

[75] Inventors: Julius A. Vida, Boston; Carlos M. Samour, Wellesley, both of Mass.

[73] Assignee: The Kendall Company, Walpole, Mass.

[22] Filed: June 10, 1974

[21] Appl. No.: 477,980

Related U.S. Application Data

[62] Division of Ser. No. 259,252, June 2, 1972.

[52] U.S. Cl................................. 424/254; 260/257
[51] Int. Cl.[2]...................................... A61K 31/515
[58] Field of Search.................... 260/257; 424/254

[56] References Cited

UNITED STATES PATENTS 3,595,862  7/1971  Vida ................................. 260/257

OTHER PUBLICATIONS

Samour et al., J. Med. Chem. (1971), Vol. 14, No. 3, pp. 187–189.

Vida et al., J. Med. Chem. (1971), Vol. 14, No. 3, pp. 190–193.

*Primary Examiner*—Stanley J. Friedman

[57] ABSTRACT

A series of 1-methyl-3-alkoxymethyl-5,5-disubstituted barbituric acids wherein the alkoxy group contains 1–4 carbon atoms is disclosed. Therapeutic compositions and a method of treating convulsions based on these compounds are described.

8 Claims, No Drawings

THERAPEUTIC COMPOSITIONS CONTAINING 1-METHYL-3-ALKOXYMETHYL-5,5-DISUBSTITUTED BARBITURIC ACID COMPOUNDS

This is a division of application Serial No. 259,252 filed Jun. 2, 1972.

This invention relates to selected substituted barbituric acids, to the use thereof as anticonvulsant agents for treating convulsions and seizures in warm-blooded animals, and to therapeutic compositions containing these compounds. More particularly, this invention relates to 1-methyl-3-alkoxymethyl-5,5-disubstituted barbituric acids having the structural formula

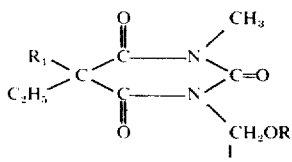

wherein R is an alkyl group having 1–4 carbon atoms and $R_1$ is a phenyl group or an ethyl group.

Certain derivatives of barbital have been known to exhibit convulsant properties in warm-blooded animals. Bush and Butler in the J. Pharm. and Exper. Therapy, Vol. 61, No. 2 (1937) at page 142 reported that dimethyl barbital (1,3-dimethyl-5,5-diethyl barbituric acid) produced clonic convulsions in mice. Ibid., page 145 it was reported that diethylbarbital (1,3-diethyl-5,5-diethyl barbituric acid) also produced clonic convulsions in mice. On the other hand, metharbital (1-methyl-5,5-diethyl barbituric acid) is known as an anticonvulsant agent in warm-blooded animals.

Phenobarbital and its derivative mephobarbital (1-methyl-5-ethyl-5-phenyl barbituric acid), although possessing anticonvulsant properties, suffer from the disadvantage that they exhibit hypnotic properties as well. Recently N,N'-dialkoxymethyl-5-ethyl-5-phenyl barbituric acids have been prepared and found to be anticonvulsant agents which do not exhibit hypnotic properties.

It has now been found that by substituting one hydrogen of one of the methyl groups in the formula of 1,3-dimethyl-5,5-diethyl barbituric acid or 1,3-dimethyl-5-ethyl-5-phenyl barbituric acid with an alkoxy group having 1–4 carbon atoms, effective anticonvulsant agents free from deterrent hypnotic properties are produced.

The compounds of this invention may be made by reacting metharbital or mephobarbital with equimolar proportions of certain alkaline materials to form a salt in the reaction mixture, then reacting the salt with a halomethyl alkyl ether such as chloromethyl methyl ether or chloromethyl butyl ether in a suitable solvent such as dimethylformamide, dimethyl sulfoxide, dimethyl acetamide, hexamethyl phosphoramide and the like over a wide range of temperatures, conveniently from about −10°C up to the boiling point of the solvent. The desired products are obtained in high yield and in an excellent state of purity; they can conveniently be isolated by conventional techniques such as extraction, distillation, filtration, preparative chromatography, etc.

The alkaline materials which may be employed to react with the barbituric starting material include sodium hydride, lithium hydride, potassium hydride, potassium tertiary butoxide and lithium hydroxide, as well as mixtures of two or more of such materials. Of these alkaline materials, the hydrides are preferred because the by-product of the reaction in that case is hydrogen gas which readily escapes from the reaction mixture, causing the reaction to proceed to completion very rapidly and facilitating purification of the product.

The compounds of this invention can be formulated for oral or parenteral administration according to conventional techniques. Effectiveness and toxicity of these compounds is such that each dosage unit can contain from 5 to 500 mg. of active material. Compositions for oral administration can be solid or liquid and can take the form of syrups, isotonic solutions, tablets, capsules etc. Suitable solid physiologically acceptable carriers include lactose, magnesium stearate, sucrose, talc, stearic acid, gelatin, polyvinyl pyrrolidone etc. Exemplary liquid physiologically acceptable carriers are peanut oil, olive oil, sesame oil and water. Furthermore, the carrier may include a time delay material such as glyceryl monostearate or glyceryl distearate, alone or in combination with a wax.

If a solid carrier is used, the preparation can be tabletted, placed in a hard gelatin capsule or in the form of a troche or lozenge. The amount of solid carrier will vary widely but preferably will be from about 25 mg. to about 1 g. If a liquid carrier is used, the preparation may be in the form of a soft gelatin capsule, placed in an ampule or in a liquid suspension.

For parenteral administration, the carrier or excipient may be a sterile, parenterally acceptable liquid; e.g., water or a parenterally acceptable oil; e.g., arachis oil contained in ampules.

While any of the above compositions are efficacious, preferred are tablets for oral administration.

The procedures employed for demonstrating efficacy of the compounds as set forth in the following examples were as follows:

All tests, with the exceptions noted, were conducted on adult albino male mice (Charles River strain); the dosage consisted of the active agent suspended in 10% aqueous acacia and was administered orally unless otherwise indicated.

Acute oral toxicity was determined in the conventional manner. The results were expressed as $LD_{50}$, the dose required to produce death in 50% of the animals treated, determined graphically.

Anticonvulsant effectiveness of each agent against maximal electroshock was determined 1 hour after administration of the agent. The time of peak anticonvulsant activity was determined by administering dosages of various sizes to a group of animals and administering a maximal electroshock to the animals at intervals thereafter by supplying 60 ma. current through a corneal electrode for 0.2 second. Protection was indicated if the animal failed to show the tonic extensor component of the maximal electroshock seizure pattern in unprotected animals. The time of peak effect thus determined was used for all subsequent tests of anticonvulsant activity on the same active agent.

Anticonvulsant effectiveness was determined one hour after administration of the agent against a convulsive dose of Metrazol (106.25 mg/kg) injected subcutaneously; the criterion for effectiveness was failure to show clonic convulsive seizures.

EXAMPLE 1

Lithium hydride (3.97 g.; 0.50 mole) was added to an ice cooled, stirred solution of mephobarbital (123.1 g.; 0.50 mole) in 1250 ml. of dimethylformamide. After 90 minutes, chloromethyl methyl ether (44.2 g.; 0.55 mole) was added dropwise over a period of 30 minutes. The colorless solution was stirred in the cold for 2 hours and then poured into 2,000 ml. of ice water. The solid precipitate was collected, washed with water and air-dried to yield 135.8 g. of crude product. Crystallization from 600 ml. of ethanol yielded 101.6 g. (70% of theory) of 1-methyl-3-methoxymethyl-5-ethyl-5-phenyl barbituric acid, m.p. 115°–116°C.

Analysis — Calc'd for $C_{15}H_{18}O_4N_2$: C, 62.05; H, 6.25; N, 9.65. Found: C, 62.19; H, 6.09; N, 9.40.

Pharmacological testing of this compound gave the following results:

| | Dosage, mg/kg |
|---|---|
| Acute Toxicity LD$_{50}$ | <1000 |
| Anticonvulsant Activity | |
| Maximal Electroshock, ED$_{50}$ | <125 |
| Metrazol, ED$_{50}$ | <25 |

EXAMPLE 2

Lithium hydride (0.79 g.; 0.10 mole) was added, with stirring, to a solution of mephobarbital (24.2 g.; 0.099 mole) in 250 ml. of dimethylformamide which had been previously cooled in an ice water bath. After 90 minutes, chloromethyl n-butyl ether (b.p. 133°–134°C, 12.3 g.; 0.10 mole) was added dropwise to the cooled solution over a period of 30 minutes. The resulting solution was stirred overnight at room temperature and then poured into 600 ml. of ice water to precipitate the crude product. After three hours of stirring, the solid was collected, washed with water, dried and recrystallized from alcohol-water to yield 19.5 g. of 1-methyl-3-(n-butoxymethyl)-5-ethyl-5-phenyl barbituric acid, m.p. 55.5°–56.5°C. A second crop of 7.8 g. was obtained from the mother liquor.

Analysis — Calc'd for $C_{18}H_{24}O_4N_2$: C, 65.04; H, 7.28; N, 8.43. Found: C, 65.17; H, 7.25; N, 8.38.

The compound exhibited anticonvulsant activity against maximal electroshock; the ED$_{50}$ was found to be approximately 125 mg/kg (3 out of 6 animals protected) while the time of peak activity was 2 hours.

EXAMPLE 3

Lithium hydride (0.79 g.; 0.10 mole) was added, with stirring, to a solution of metharbital (19.8 g.; 0.10 mole) in 250 ml. of dimethylformamide which had been previously cooled in an ice water bath. After two hours, chloromethyl methyl ether (8.9 g.; 0.11 mole) was added dropwise to the cooled solution over a period of 30 minutes. The resulting solution was stirred overnight at room temperature and then poured into 750 ml. of ice water yielding a cloudy solution. After three hours of stirring, the mixture was extracted with ethyl acetate. The combined ethyl acetate extracts were washed with 250 ml. of water and 250 ml. of saturated sodium chloride solution, dried over sodium sulfate, and concentrated to a yellow oil on the rotary evaporator. The oil was purified by eluting from a silica gel column with benzene, followed by distillation of the early fractions from the column to give a colorless oil, b.p. 117°C at about 1 mmHg. pressure. The oil solidified on cooling with dry ice to give a white, crystalline mass, 1-methyl-3-methoxymethyl-5,5-diethyl barbituric acid, m.p. 28°–29°C.

Analysis — Calc'd for $C_{11}H_{18}O_4N_2$: C, 54.53; H, 7.49; N, 11.56. Found: C, 54.38; H, 7.49; N, 11.34.

When tested as described, the compound exhibited anticonvulsant activity against maximal electroshock; the ED$_{50}$ was found to be approximately 150 mg/kg (2 out of 6 animals protected at 125 mg/kg, 6 out of 6 protected at 250 mg/kg).

EXAMPLE 4

Lithium hydride (0.79 g.; 0.10 mole) was added, with stirring, to a solution of metharbital (19.8 g.; 0.10 mole) in 250 ml. of dimethylformamide which had been previously cooled in an ice water bath. After two hours, chloromethyl n-butyl ether (b.p. 133°–134°C, 12.3 g.; 0.10 mole) was added dropwise to the cooled solution over a period of 30 minutes. The resulting solution was stirred overnight at room temperature and then poured into 750 ml. of ice water, precipitating an oil. After 3 hours of stirring, the two liquid layers were separated and the aqueous layer was extracted with ethyl acetate. The combined organic layers were washed with 250 ml. of water and 250 ml. of saturated sodium chloride solution, dried over sodium sulfate, and concentrated to a pale yellow oil on the rotary evaporator. The oil was purified by elution from a silica gel column with hexane-benzene mixtures, followed by distillation of the early fractions from the column to give a colorless oil, 1-methyl-3-(n-butoxymethyl)-5,5-diethyl barbituric acid, b.p. 130°C at about 1 mmHg pressure.

Analysis — Calc'd for $C_{14}H_{24}O_4N_2$: C, 59.13; H, 8.51; N, 9.85. Found: C, 59.63; H, 8.02; N, 9.86.

When tested as described, the compound exhibited anticonvulsant activity against maximal electroshock; the ED$_{50}$ was found to be approximately 125 mg/kg (two out of five protected after 2 hours) with the time of peak activity being about two hours. The LD$_{50}$ was found to be approximately 500 mg/kg (two out of five deaths after 24 hours).

What is claimed is:

1. A therapeutic composition for treatment of convulsions in warm-blooded animals comprising a physiologically acceptable carrier and an effective amount of a compound having the structural formula

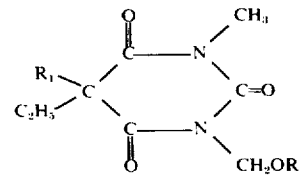

wherein R is an alkyl group having 1–4 carbon atoms and $R_1$ is a phenyl group or an ethyl group.

2. A composition as claimed in claim 1 in which $R_1$ in said compound is a phenyl group.

3. A composition as claimed in claim 1 in which said compound is 1-methyl-3-methoxymethyl-5-ethyl-5-phenyl barbituric acid.

4. A composition as claimed in claim 1 in which said compound is 1-methyl-3-butoxymethyl-5-ethyl-5-phenyl barbituric acid.

5. A composition as claimed in claim 1 in which $R_1$ in said compound is an ethyl group.

6. A composition as claimed in claim 1 in which said compound is 1-methyl-3-methoxymethyl-5,5-diethyl barbituric acid.

7. A composition as claimed in claim 1 in which said compound is 1-methyl-3-butoxymethyl-5,5-diethyl barbituric acid.

8. The method of treating convulsions in warm-blooded animals which comprises administering to said animals an effective amount of compound having the structual formula

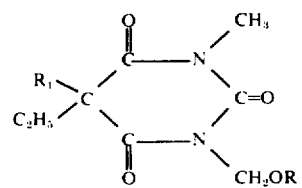

wherein R is an alkyl group having 1-4 carbon atoms and $R_1$ is a phenyl group or an ethyl group.

* * * * *